United States Patent [19]
Hughes

[11] 3,988,685
[45] Oct. 26, 1976

[54] ELECTRONIC FREQUENCY SENSOR

[75] Inventor: Ronald Wayne Hughes, Madison, Ohio

[73] Assignee: Harvey Hubbell Incorporated, Bridgeport, Conn.

[22] Filed: Mar. 4, 1975

[21] Appl. No.: 555,162

[52] U.S. Cl. .............................. 328/141; 328/155; 307/265; 307/273; 328/58
[51] Int. Cl.$^2$ ......................................... H03K 1/18
[58] Field of Search ........... 328/141, 155, 207, 133, 328/58; 307/265, 273

[56] References Cited
UNITED STATES PATENTS

| | | | |
|---|---|---|---|
| 3,304,439 | 2/1967 | Stratton et al. | 328/207 X |
| 3,340,951 | 9/1967 | Vitt | 328/141 X |
| 3,441,342 | 4/1969 | Ball et al. | 328/155 X |
| 3,521,174 | 7/1970 | Naubereit et al. | 328/141 X |
| 3,646,370 | 2/1972 | Lowe | 307/265 X |
| 3,706,935 | 12/1972 | Hughes | 328/155 |

OTHER PUBLICATIONS

Electronics – Circuit Designer's Casebook, Copyright 1972, McGraw-Hill Book Co.

Primary Examiner—John S. Heyman
Attorney, Agent, or Firm—Roylance, Abrams, Berdo & Kaul

[57] ABSTRACT

A motor speed control system in which the rotor output frequency is filtered to remove slot noise and applied to one or more frequency discriminator units (FDU's) which provide control signals to operate relays which control contactors in a conventional motor controller having rotor speed control resistances. Each FDU compares the input frequency with its own setpoint frequency and operates to change rotor circuit resistance if the input frequency differs from the setpoint by a predetermined amount. The rotor signal is separated into two rectangular wave signals, one of which triggers a monostable circuit. The Q and $\overline{Q}$ monostable outputs are compared with the input in logic circuit means which produces a relay driving output under specified signal time-overlap conditions. A feedback signal changes the duty cycle of the monostable when the output is provided, thereby establishing a frequency "dead band" bracketing the setpoint. A "low signal" circuit insures a predetermined state of the FDU under low level or zero frequency conditions. The output operation can be reversed for counter torque motor deceleration applications.

8 Claims, 4 Drawing Figures

ELECTRONIC FREQUENCY SENSOR

This invention relates to frequency sensing apparatus.

In the control of electric motors, particularly induction motors of the wound rotor type, it is common practice to provide some kind of apparatus to control the speed of a motor under varying load conditions and varying torque requirements. The wound rotor has windings similar to the stator windings. Voltages are induced in these windings which are connected to slip rings so that connection may be made to external impedances, usually resistors, to limit the starting current, improve the power factor, or control speed. Shorting switches are connected to external resistances which limit the starting current. The resistance in the external circuit is gradually reduced, by selectively closing shorting switches, to bring the motor up to speed. External impedances other than resistors can be employed, but the techniques generally involve closing switches to add or to remove impedances as load variations occur to maintain the motor speed and torque at desired levels.

Many kinds of control devices have been employed to control relays which actuate the switches to accomplish this speed control. One technique which has been commonly employed is to use a timing device which closes selected switches at predetermined intervals of time after starting of the motor. These devices are based on the assumption that a load not exceeding the rated load of the motor is applied and that, therefore, the acceleration of the motor will follow a standard acceleration curve, or will not exceed the load-time characteristics represented by that curve. However, if the load deviates substantially from this curve, the motor may not accelerate as quickly as anticipated and, as impedances are removed from the external control circuit, motor currents increase to intolerable levels.

Another technique is to employ switches physically attached to the rotating portions of the motor, these switches being speed responsive. The concept in this technique is to employ switches which close at various levels of motor speed, thereby removing impedances at the proper speed levels. However, this technique has not proven to be practical because the switches do not operate reliably.

A third technique has been to employ a fixed frequency reference, such as a fixed frequency oscillator, and to sense the frequency output of the rotor as connected through the slip rings. A characteristic of wound rotor motors is that the frequency output is inversely proportional to speed. Thus, in a 60 Hertz motor, the frequency of the voltage developed in the rotor is 60 Hertz at zero speed and zero at synchronous speed, the deviation from synchronous speed being detectable as a deviation from zero frequency.

This last technique has the disadvantage of inaccuracy in that it is very difficult to detect a small deviation from synchronous speed, partly because the frequency difference is very small and partly because of the voltage variation which also occurs in the rotor voltage output. It is characteristic of a wound rotor motor that the rotor output voltage decreases along with the frequency so that the amplitude of the signal being detected is very small close to synchronous speed.

An object of the present invention is to provide a frequency sensitive device capable of providing control signals usable to control motor speed in a wound rotor motor in a reliable and accurate fashion.

A further object is to provide a speed control having a frequency detection circuit in which the acceleration control and running speed control is referred to a reference frequency which is not constant but which provides a predetermined hysteresis band to avoid unnecessary operation of the control apparatus near the switching point of the control apparatus.

It will be recognized that while the frequency responsive circuit of the present invention is particularly useful with the control of wound rotor motors, it is not limited to use therewith. On the contrary, the invention is applicable to any system in which a hysteresis effect in frequency control is desirable.

Accordingly, a further object is to provide a frequency control apparatus employing logic circuit elements in which this hysteresis effect is available.

Broadly described, the apparatus of the invention includes means for accepting a time-varying periodic input signal and for generating first and second rectangular output signals representative of the input signal frequency, first circuit means responsive to one of the first and second signals for producing rectangular pulses having one of two possible predetermined durations, first logic circuit means for comparing the time relationship between the rectangular pulses and the other one of the first and second signals to produce a control signal when the pulses and the signals overlap in time, second logic circuit means responsive to the control signal for producing a feedback signal and actuating signal, the first circuit means being responsive to the feedback signal to produce rectangular pulses having the other one of the two possible predetermined durations, third logic circuit means for comparing the time relationship between the one of the first and second signals and the inverse of the rectangular pulses produced by the first circuit means and for producing a reset signal, the second logic circuit means being responsive to the reset signal to terminate production of the feedback and actuating signals, and means for responding to the actuating signal to actuate a utilization device. In the context of a speed control for a wound rotor motor, the first and second rectangular signals can be supplied to a plurality of devices each having the first, second and third logic circuit means and the means for responding to the actuating signal, and having first circuit means set to produce rectangular pulses having different durations. By this technique, each of the devices receiving the first and second rectangular signals representative of the input signal frequency can operate to control toward a different ultimate frequency in sequency, accomplishing a smooth acceleration of the motor. In this event, the utilization device constitutes the switchable impedances in the motor speed control circuit.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
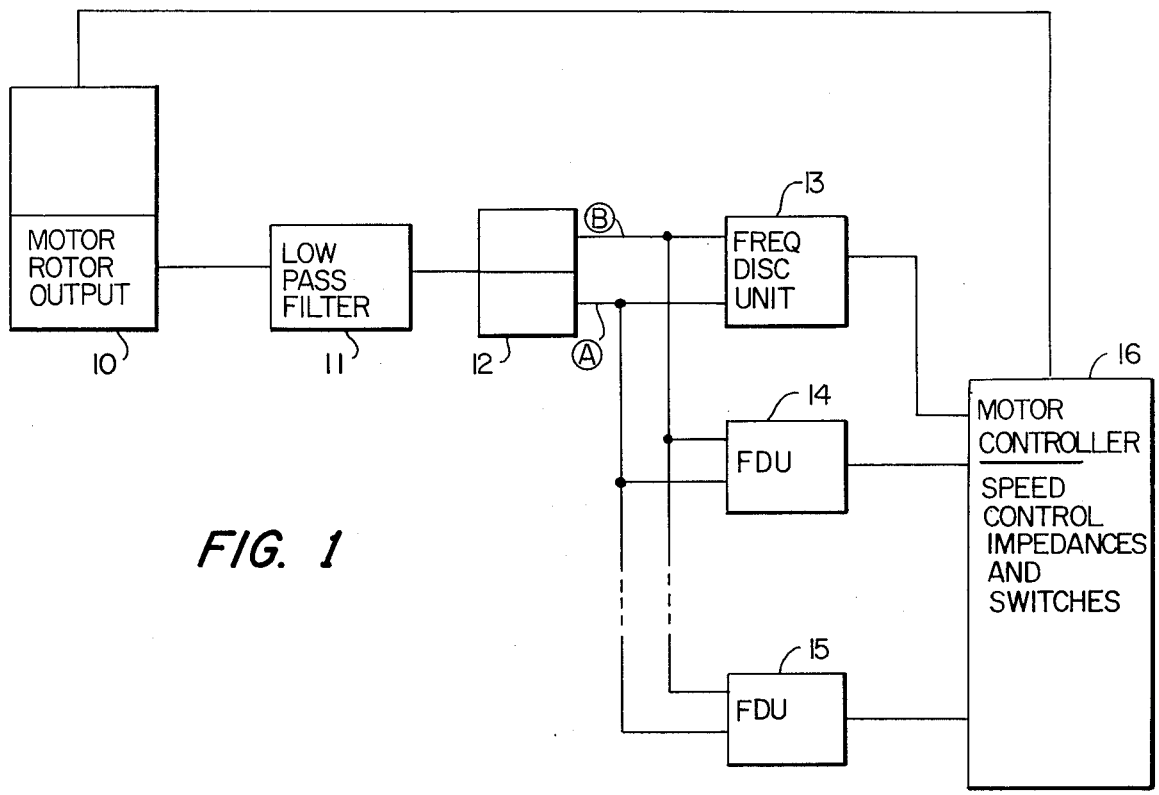
FIG. 1 is a block diagram of a speed control system according to the invention.

Referring first to FIG. 1, the overall system will be seen to include a motor 10 which has a wound rotor and which produces a signal, depending upon rotor speed, which has well known frequency and amplitude characteristics. The output of the rotor can be supplied to a transformer to alter the voltage levels produced from the rotor to levels which are suitable for use in the subsequent circuitry. The motor, rotor and transformer are all conventional in nature and need not be further described. The rotor output is connected to a low pass filter 11 which is included to remove slot noise but to permit the fundamental signal frequency from the rotor to pass. The substantially sinusoidal signal emerging from filter 11 is connected to a multivibrator 12 which produces two output signals each comprising a series of spaced rectangular pulses representing one polarity of the sinusoidal signals supplied to the multivibrator. As indicated in FIG. 1, a signal A is produced on one output conductor from multivibrator 12 and a signal B is produced on the other conductor, these signals being depicted in FIG. 4 at traces A and B. It will be observed that both of these signals have the same polarity but that the signals on trace A, for example, represent the positive half-waves of the sinusoidal input signal and the pulses in trace B represent the negative half-waves of the signal.

Signals A and B are conducted in parallel to a plurality of frequency discriminator units 13, 14 and 15. While three such circuits are illustrated, it will be observed that a larger number can be used if necessary or desirable, depending upon the number of setpoint frequencies of each control unit, the desired acceleration curve, the frequency at which the motor operates, and the like. The frequency discriminator units will be described in greater detail hereafter, but it will be sufficient at present to state that each of these units provide an output signal capable of actuating impedance switching devices in a motor speed control impedance and switching unit 16 which is connected to and controls the acceleration and speed of motor 10.

Figure 2:
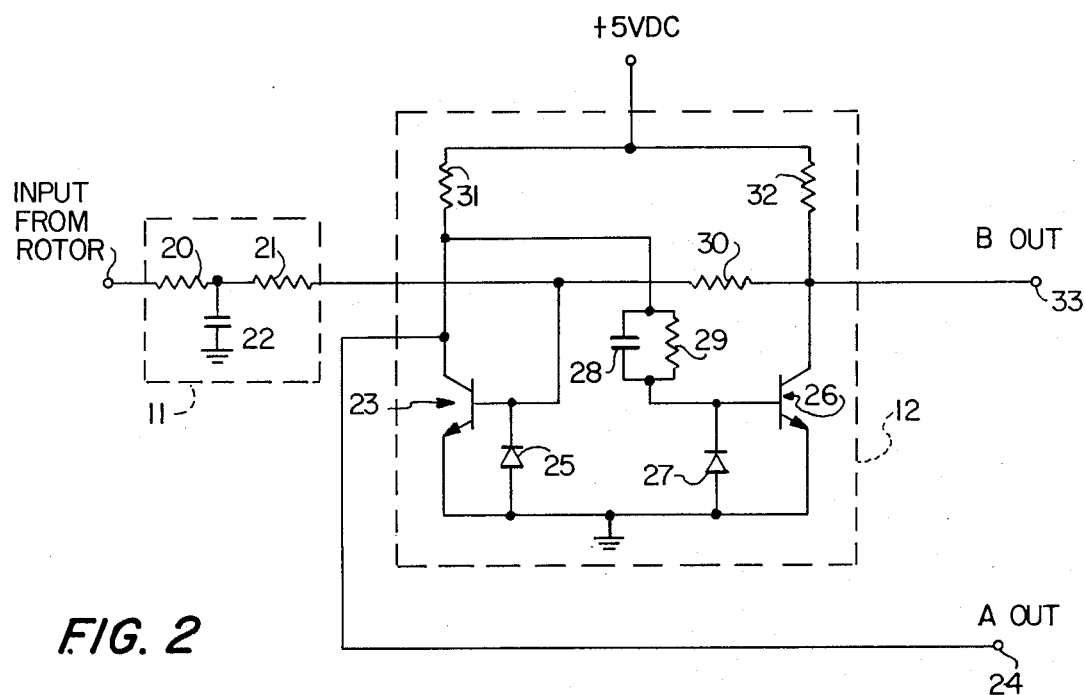
FIG. 2 is a schematic diagram of filter and multivibrator circuits usable in the system of FIG. 1.

While the filter and multivibrator circuits are conventional in nature, they are disclosed for completeness in greater detail in FIG. 2, the slot filter 11 being seen to comprise series connected resistors 20 and 21 with a capacitor 22 being connected between the junction between these two resistors and ground. The output of the slot filter is connected to multivibrator 12 at the base electrode of an NPN transistor indicated generally at 23. Transistor 23 is connected to switch abruptly between fully conductive and nonconductive states so that the output at the collector of transistor 23 is a rectangular wave form and provides the A output signal at terminal 24. A diode 25 is connected between the base and the emitter electrodes.

Similarly, an NPN transistor indicated generally at 26 is provided with a diode 27 between its base and emitter electrodes so that the output signal at the collector of transistor 26 is a rectangular wave form comprising the signal B which appears at output terminal 33. Diodes 25 and 27 are protective diodes for the base-emitter junction of transistor 23 and 26, respectively. Cross-coupling between the transistors is provided by a parallel circuit including a capacitor 28 and resistor 29 connected between the collector of transistor 23 and the base of transistor 26, and by a resistor 30 connected between the collector of transistor 26 and the base of transistor 23. Biasing resistors 1 and 32 connect the collector electrodes of the two resistors to a positive five volt d.c. supply, the emitter electrodes of the transistors being connected to ground. As previously indicated, this multivibrator is conventional in nature and will not be further discussed.

As previously indicated, each of the frequency discriminator units 13, 14 and 15 is substantially identical with the exception of the selection of circuit values of certain adjustable components, as will be indicated hereinafter. Accordingly, only one of these units will be described in detail, the unit being shown in FIG. 3. As shown therein, the A and B input signals produced by the multivibrator circuit 12 appear at terminals 24 and 33 in FIG. 3, the A signal being connected to the switching control input terminal of a monostable multivibrator 35. Multivibrator 35 is conventional in nature in the sense that it normally resides in a stable state and departs from that stable state in response to a positive-going rectangular wave form such as the A signal supplied to its switching control input terminal. It then remains in an unstable state, the duration of which is primarily determined by the value of a timing capacitor 36. However, the duration of this unstable state can be varied by the application of a control current, which will be referred to herein as a feedback signal, supplied on a conductor 37. The signal supplied on conductor 37 operates to alter the charging current supplied to the timing capacitor 36, thereby accelerating or delaying the termination of the unstable state. Multivibrator 35 has outputs Q and $\overline{Q}$, the output Q being a positive rectangular pulse which exists during the unstable state and $\overline{Q}$ being a positive rectangular pulse which exists during the stable state. The Q output is connected to one input terminal of a NAND circuit 38. The $\overline{Q}$ output is connected to one input terminal of a NAND circuit 39, to the input terminal of a "low signal" circuit 40, and, through a differentiating capacitor 41 to the reset input terminal of a bistable circuit 42. The differentiated $\overline{Q}$ output signal is also connected to a positive five volt d.c. supply through a parallel circuit including a diode 43 and a resistor 44.

The B input signal is connected to the other input terminal of NAND circuit 38, and the A input signal is also connected to the other input terminal of NAND circuit 39. The output of NAND circuit 38 is connected to the SET input of bistable circuit 42 and to the SET input of a bistable circuit 45. The output of NAND circuit 39 is connected to both inputs of a NAND circuit 46, this circuit being connected to perform an inverting function. The output of NAND circuit 46 is connected to one input of a NAND circuit 47, the other input thereof being connected to the $\overline{Q}$ output of bistable circuit 42. The output of NAND circuit 47 is connected through a differentiating capacitor 48 to the reset input terminal of bistable circuit 45.

The low signal circuit 40 includes a diode 50 connected to receive the input signal to that circuit and resistors 51 and 52, these three components being connected in series circuit relationship between the $\overline{Q}$ output of multivibrator 35 and the base electrode of a NPN transistor indicated generally at 53. The collector of transistor 53 is connected to the reset input of bistable circuit 45 and the emitter thereof is connected to ground. A parallel circuit including a capacitor 54 and a resistor 55 is connected between a positive five volt d.c. supply and the junction between resistors 51 and 52.

Figure 3:
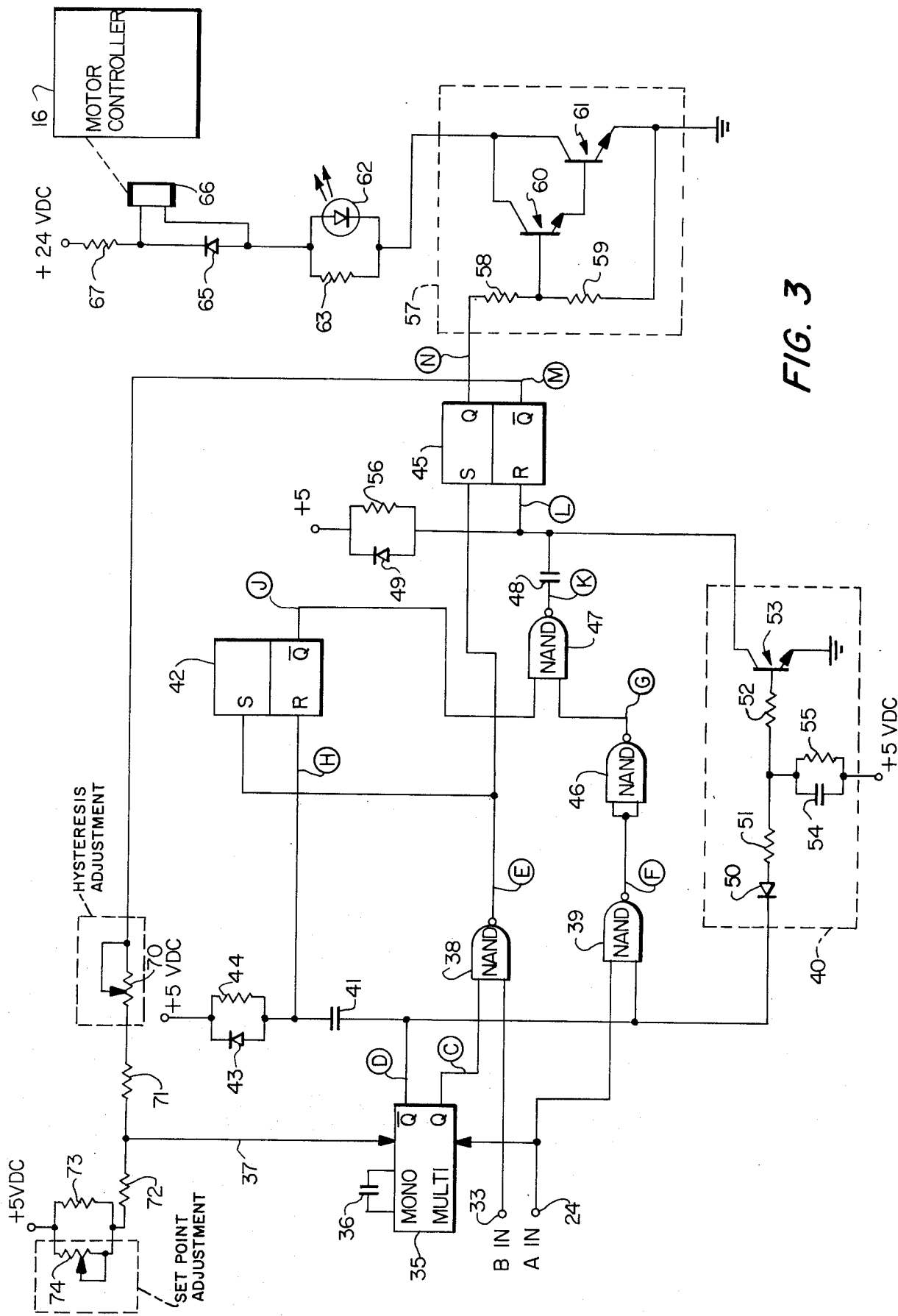
FIG. 3 is a schematic diagram, partly in block form, of a frequency discriminator unit usable in the apparatus of FIG. 1.

The Q output of bistable circuit 45 is connected to a relay driver circuit 57 which includes a voltage divider circuit having resistors 58 and 59 connected in series circuit relationship between the Q output and ground. The junction between these two resistors is connected to the base electrode of a NPN transistor indicated generally at 60. The emitter electrode of transistor 60 is connected to the base electrode of a NPN transistor indicated generally at 61, the emitter electrode of which is connected to ground. The collector electrodes of transistors 60 and 61 are connected to each other and to a light emitting diode 62 which is connected in parallel circuit relationship with a resistor 63. This parallel circuit is connected to the energizing winding of a relay 66 which is connected in parallel with a diode 65. This parallel circuit is then connected through a resistor 67 to a positive 24 volt d.c. supply, this source being to energize the relays. As schematically indicated in FIG. 3, this relay operates contact sets within the motor speed controller unit 16 as previously discussed. It will be apparent that additional relays can be supplied, if necessary.

The $\bar{Q}$ output of bistable circuit 45 is connected to a variable resistance 70 which is in series with a fixed resistor 71 and a fixed resistor 72. This series circuit is connected through a parallel circuit including a fixed resistor 73 and the variable resistance 74 to a positive five volt d.c. supply. The junction between resistors 71 and 72 is connected through conductor 37 to monostable multivibrator 35, as previously described.

Figure 4:
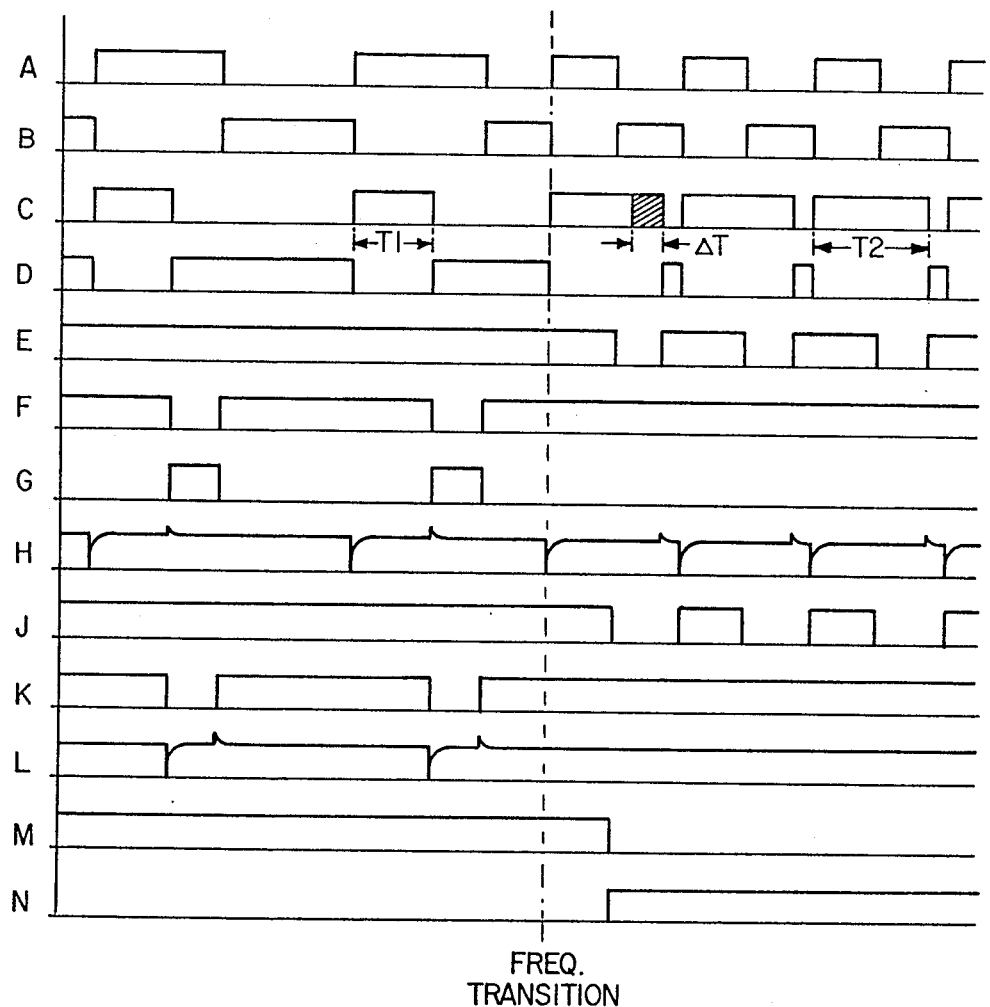
FIG. 4 is a timing diagram showing wave forms typically generated by the apparatus of FIGS. 2 and 3.

For purposes of correlating the circuit diagram of FIG. 3 with the timing diagram of FIG. 4, the various wave form traces on FIG. 4 have been assigned letters A through N and these letters have also been applied to the schematic diagram of FIG. 3 identifying the points in the circuit at which these wave forms appear. It will be observed that the left-hand portion of the timing diagram of FIG. 4 portrays a situation in which the input frequency is less than the desired setpoint frequency, while the right-hand portion of this diagram portrays a situation in which the input frequency is greater than the setpoint frequency. As will be seen hereinafter, the setpoint frequency is defined in different ways under these circumstances.

The operation of the apparatus commences with the application of the A and B input signals to terminal 24 and 33, the A signal being applied to begin switching of multivibrator 35. The multivibrator then produces output pulses, the Q output being a train of pulses each one of which commences substantially simultaneously with the initial portion of the A input signal. The $\bar{Q}$ output signal is, by definition, the inverse of this and is displayed as trace D. When the input frequency is less than the setpoint frequency, the duration of the unstable state of the multivibrator is T1, an interval less than the duration of any single input pulse. Thus, the unstable state expires before commencement of an input signal B pulse so that these pulses do not exist at the same time. Signals B and C are applied to NAND circuit 38. The output of that circuit is low only when both inputs applied thereto are high. Since neither B nor C exists when the other is present, that circumstance does not arise under the specified frequency conditions and signal E at the output of circuit 38 remains high throughout this interval. The NAND circuit output is applied to the set inputs of both of bistable circuits 42 and 45. The $\bar{Q}$ output from circuit 35 is differentiated by capacitors 41 and maintains bistable 42 in its RESET state.

At the same time the A input and the $\bar{Q}$ output, traces A and D, are applied to NAND circuit 39. Since these signals are both high during the latter portions of the A pulses, the output F of circuit 39 is low for a relatively short interval of each A pulse, as shown in trace F in FIG. 4. This signal, as inverted by circuit 46, and as shown in trace G, is applied to one input of NAND circuit 47, the other input of which is receiving input J from the $\bar{Q}$ output of bistable circuit 42, this input being continually high as shown in trace J. Thus, NAND circuit 47 is provided with two high inputs whenever trace G goes high and the output K thereof is low during those same intervals. This output signal is differentiated by capacitor 48 and a reset impulse is therefore applied at the leading edge of each G pulse, thereby maintaining bistable circuit 45 in its reset state. Thus, the Q output of circuit 45, trace N, is low during this entire interval, providing no output signal to the relay driving circuit, permitting the transistors therein to remain nonconductive and permitting the relays to remain de-energized. With these relays de-energized, the impedances in motor controller 16 are effectively removed from the motor driving circuit thus providing for greater driving torque for the motor and thereby allowing the motor to come up to the speed corresponding to the next acceleration point of the controller.

As previously stated, the $\bar{Q}$ output M of circuit 45 is high throughout this interval, providing a high level, of approximately five volts, to the resistive circuit including resistors 70–74.

As soon as the frequency of the input signal increases to a point at which the unstable state of the multivibrator is longer than the duration of a single input signal pulse, an overlap between the Q signal output from multivibrator 35 and the B input signal occurs, presenting two high signals to NAND circuit 38 and causing the output of that circuit to fall to a low level as indicated in the right-hand portion of trace E of FIG. 4. The pulses produced at this output set bistable circuit 42 on the occurrence of each negative going signal E, causing the $\bar{Q}$ output J to pulse as indicated in trace J. This signal is supplied to NAND circuit 47. However, NAND circuit 39, under these circumstances, is receiving inputs A and D which are not simultaneously high at any time, thereby causing the output of the NAND circuit to remain high as shown in trace F. This output, when inverted by NAND circuit 46, is continually low as indicated in trace G. Thus, NAND circuit 47 is not simultaneously receiving two high signals and the output thereof remains high, producing no reset pulses for bistable circuit 45. Thus, the Q output N of circuit 45 goes high at the first occurrence of an overlap between signals B and C and remains in that condition until the frequency circumstances change. Thus, the relay driving circuit transistors are rendered conductive and the relays are energized. Impedance is placed back into the rotor circuit of the motor by the controller 16, reducing the motor torque and allowing the motor to decelerate. It will be observed that the $\bar{Q}$ output M of circuit 45 is now low, causing the signal on conductor 37 to drop to a low level. Thus, the additional current supplied to the monostable multivibrator 35 is decreased from the level which existed under the frequency circumstances previously discussed and the unstable state thereof is lengthened. There is, therefore, an abrupt transition in the duty cycle of the pulses produced by monostable multivibrator 35 as soon as frequency equality is reached, preventing an oscillatory condition from existing.

The specific operation of circuit 35 is as follows. When the input frequency is less than the setpoint frequency, the current supplied from the high $\overline{Q}$ output of bistable 45 algebraically adds to the current supplied from the 5 volt source through the resistor network 72, 73 and 74 at the node between resistors 71 and 72. Capacitor 36 is thus supplied with the sum of those currents, decreasing the charging time of the capacitor and the duty cycle of circuit 35. Conversely, when $\overline{Q}$ is low, this signal is at ground level and the current through resistances 70 and 71 subtracts from the node, decreasing the charging current to capacitor 36 and increasing the duty cycle of circuit 35.

It will also be observed that the pulses D from circuit 35 which are differentiated by capacitor 41 and applied to the reset input of bistable circuit 42 operate to reset that circuit, causing the pulsing of output signal J. So long as the overlap remains with the new frequency circumstances, however, the circuit is again set by each subsequent overlap.

As previously indicated, it is characteristic of a wound rotor motor for the rotor output to decrease in frequency and amplitude when the motor approaches synchronous speed. The desired output condition for the circuit is the same condition which would exist with the input frequency less than the setpoint frequency. To be sure that this output is provided, and to prevent any possibility of the opposite condition existing without correction, a "low signal" circuit 40 is provided, with essentially no signal present at inputs A and B, the monostable multivibrator produces no output and the $\overline{Q}$ output D remains high. It will be recognized that when the multivibrator 35 is producing an output, a relatively constant or "average" low level is presented to the input of circuit 40, blocking diode 50 and permitting capacitor 54 to maintain a significant charge since it is connected between this low level and a five volt d.c. supply. Capacitor 54 is a relatively large capacitor in the order of 25 microfarads. The base of transistor 52 therefore does not have sufficient current to become conductive and it produces no output. However, when the $\overline{Q}$ output D is maintained high, the capacitor 54 begins to discharge through resistor 55, permitting the junction between resistors 51 and 52 to elevate in potential, raising the base potential of transistor 53 to a point at which the transistor becomes conductive. With the emitter connected directly to ground, the transistor switches rather rapidly into conduction, producing a pulse at the reset input of bistable circuit 45 which performs the same reset task as would the output from NAND circuit 47 under strong signal conditions. The bistable circuit is thereby maintained in a reset condition, keeping the relay drive circuit nonconductive and the relay de-energized. When monostable multivibrator again responds to an input signal, capacitor 54 is charged quickly through diode 50 and resistor 51, thereby providing insufficient drive to the base of transistor 53, allowing it to become nonconductive and thereby permitting normal operation of bistable circuit 45, depending upon the frequency conditions.

In the following table there is provided a listing of the various resistive and capacitive components described herein, giving typical circuit values for an apparatus for use with a 60 Hertz motor.

TABLE OF CIRCUIT VALUES

Resistors (Ohms)

| Identifying Number | Value |
|---|---|
| 20 | 4.7 K |
| 21 | 2.7 K |
| 29 | 33 K |
| 31 | 3.3 K |
| 32 | 3.3 K |
| 44 | 6.2 K |
| 51 | 150 |
| 52 | 51 K |
| 55 | 51 K |
| 56 | 6.2 K |
| 58 | 6.2 K |
| 59 | 33 K |
| 63 | 15 |
| 67 | 43 |
| 70 | Variable between 0 and 75K |
| 71 | 15 K |
| 72 | 3.6 K |
| 73 | 75 K |
| 74 | 50 K |

Capacitors ($\mu f$)

| Identifying Number | Value | Transistors | Type |
|---|---|---|---|
| 22 | 19 | 23 | 2N3391 |
| 28 | 0.0012 | 26 | 2N3391 |
| 36 | Varies from 0.47 to 4.7 | 53 | 2N3643 |
| | | 60 | 2N5822 |
| 41 | 0.1 | 61 | 2N2102 |
| 48 | 0.01 | | |
| 54 | 25 | | |

| Diodes | Type | IC's | Type |
|---|---|---|---|
| 25 | IN914A | 42, 45 | TI 74107 |
| 27 | " | 38, 39, 46, 47 | TI 7400 |
| 43 | " | 35 | TI 74121 |
| 49 | " | | |
| 50 | " | | |
| 62 | MV5025 | | |
| 65 | IN914A | | |

It has been seen that the feedback signal on conductor 37 to circuit 35 affects the duty cycle of that circuit. Potentiometers 70 and 74 can be adjusted to define various "dead band" widths of the duty cycle so that the frequency control provided by the circuit can be either wide or narrow. Adjust of potentiometer 74 establishes the setpoint frequency and potentiometer 70 determines the hysteresis band or dead band. While there is some interaction between these adjustments, it will be recognized that these controls allow selection of the degree of hysteresis present in the circuit.

This invention also contemplates the possibility of connecting an output from the Q output of bistable 45 to the relay driver circuit rather than from the $\overline{Q}$ output. Clearly, this reverses the operation of the system to one in which a counter torque is desired. This embodiment is particularly useful when controlled deceleration of a motor is needed such as in a hoist wherein a load is being lowered and the motor is being employed to resist downward acceleration of the load in controlled descent, but the weight of the load may not be great enough to pull the hoist hook down. With this reversed connection the normal tendency of the motor to lift the load is prevented.

While one advantageous embodiment has been chosen to illustrate the invention, it will be understood by those skilled in the art that various changes and modifications can be made therein without departing from the scope of the invention as defined in the appended claims.

What is claimed is:

1. A digital frequency responsive apparatus comprising means for accepting a time-varying periodic input signal and for generating first and second rectangular output signals representative of the input signal frequency;
   first circuit means responsive to one of said first and second signals for producing rectangular pulses having one of first and second predetermined durations;
   first logic circuit means for comparing the time relationship between said rectangular pulses and the other one of said first and second signals and for producing a control signal when said pulses and said signals overlap in time;
   second logic circuit means responsive to said control signal for producing one of a feedback signal and an actuating signal;
   said first circuit means being responsive to said feedback signal to produce rectangular pulses having the other one of said first and second predetermined durations;
   third logic circuit means for comparing the time relationship between said one of said first and second signals and the inverse of said rectangular pulses and for producing a reset signal,
   said second logic circuit means being responsive to said reset signal to terminate production of said one of said feedback and actuating signals; and
   means for responding to said actuating signal to actuate a utilization device.

2. An apparatus according to claim 1 wherein said first circuit means comprises
   a source of charging current;
   a circuit having a stable state and an unstable state, said circuit having a timing capacitor and a charging circuit for said capacitor, said charging circuit being connected to said source, the duration of the unstable state of said circuit and the duration of output pulses produced by said circuit being determined by the time constant of said capacitor and said charging circuit; and
   circuit means for connecting said feedback signal to said charging circuit to be algebraically combined with the charging current from said source to alter the duration of said unstable state.

3. An apparatus according to claim 1 wherein said first circuit means comprises
   a monostable multivibrator having a timing capacitor and a charging circuit for said capacitor,
   said monostable multivibrator having a stable state and an unstable state and of a duration determined by the time constant of said capacitor and its charging circuit and the magnitude of charging current supplied to said charging circuit; and
   a source of charging current comprising
   a source of voltage;
   a series circuit including a plurality of resistors connected at one end to said source of voltage and at the other end to said second logic circuit means; and
   circuit means interconnecting said charging circuit and an intermediate point in said series circuit to provide charging current to said charging circuit.

4. An apparatus according to claim 3 wherein said second logic circuit means comprises
   a bistable multivibrator circuit having two output terminals at which output signals appear mutually exclusively, one of said output signals being said feedback signal and the other being said actuating signal, said feedback signal terminal being connected to said other end of said series circuit.

5. An apparatus according to claim 1 wherein said first logic circuit means comprises
   a NAND gate circuit having a first input connected to receive said other one of said first and second signals and a second input connected to receive said rectangular pulses from said first circuit means, and for producing a distinctive output control signal only when signals exist at said inputs concurrently.

6. An apparatus according to claim 5 wherein
   said second logic circuit means comprises a bistable circuit, said control signal being connected to the SET input thereof and said reset signal being applied to the RESET input thereof; and
   said third logic circuit means includes a NAND gate circuit having one input connected to receive said one of said first and second signals and the other input connected to receive the inverse of said rectangular pulses from said first logic circuit means.

7. An apparatus according to claim 6 and further comprising
   circuit means connected to an output of said first logic circuit means for generating a reset signal when said first logic circuit means produces no rectangular pulses for a predetermined interval; and
   means for connecting said reset signal to the RESET input of said bistable circuit.

8. A digital frequency responsive apparatus comprising
   two-state circuit means for accepting a time-varying periodic input signal and for generating first and second rectangular output signals representative of the input signal frequency; and
   a plurality of frequency discriminator units, each connected to receive said first and second rectangular output signals, each of said units comprising
   first circuit means responsive to said first rectangular output signal for producing pulses having one of first and second predetermined durations;
   circuit means for adjusting the duration of said pulses;
   first logic circuit means for comparing the time relationship between said pulses and said second rectangular output signals and for producing a control signal when pulses and said second signals overlap in time;
   second logic circuit means responsive to said control signal for producing one of a feedback signal and an actuating signal;
   said first circuit means being responsive to said feedback signal to produce rectangular pulses having the other one of said first and second predetermined durations;
   third logic circuit means for comparing the time relationship between said first rectangular output signals and the inverse of said rectangular pulses and for producing a reset signal,
   said second logic circuit means being responsive to said reset signal to terminate production of said one of said feedback and actuating signals; and
   switch means for responding to said actuating signal to actuate a utilization device.

* * * * *